United States Patent
Danzy (10) Patent No.: US 8,958,996 B2
(45) Date of Patent: *Feb. 17, 2015

(54) SYSTEM AND METHOD FOR MONITORING AND CONTROLLING PRESSURE RELIEF VALVE PERFORMANCE

(75) Inventor: Roger Dale Danzy, Pineville, LA (US)

(73) Assignee: Dresser, Inc., Addison, TX (US)

( * ) Notice: Subject to any disclaimer, the term of this patent is extended or adjusted under 35 U.S.C. 154(b) by 548 days.

This patent is subject to a terminal disclaimer.

(21) Appl. No.: 13/207,654

(22) Filed: Aug. 11, 2011

(65) Prior Publication Data

US 2011/0301881 A1 Dec. 8, 2011

Related U.S. Application Data

(63) Continuation of application No. 12/473,105, filed on May 27, 2009, now Pat. No. 8,000,909.

(51) Int. Cl.
*G01N 11/00* (2006.01)
*G01L 7/00* (2006.01)
(Continued)

(52) U.S. Cl.
CPC .............. *F16K 37/0091* (2013.01); *G01F 1/74* (2013.01); *G01F 25/0007* (2013.01); *F16K 17/04* (2013.01); *G01D 21/02* (2013.01)
USPC .......................................................... 702/50

(58) Field of Classification Search
CPC ......... G01F 1/74; G01F 25/0007; G01F 1/34; G01F 1/88; G01F 11/3409; G01K 1/026
USPC .......................................................... 702/50
See application file for complete search history.

(56) References Cited

U.S. PATENT DOCUMENTS

| 5,174,321 A | 12/1992 | Danzy |
| 5,425,270 A | 6/1995 | McDonald et al. |

(Continued)

FOREIGN PATENT DOCUMENTS

| JP | 59-145418 | 8/1984 |
| JP | 63126911 U | 8/1988 |

(Continued)

OTHER PUBLICATIONS

*Valve Monitoring Device*, Crosby/Tyco Flow Control; 1998 Anderson Greenwood Crosby (6 pages).

(Continued)

*Primary Examiner* — Michael Nghiem
(74) *Attorney, Agent, or Firm* — Paul, Frank + Collins P.C.

(57) ABSTRACT

Techniques for monitoring operation of a relief valve containing an internal flow passage with a valve seat and valve plug disposed therein. The temperature of a fluid is sensed in the internal flow passage downstream of the seat. A valve temperature signal is generated representative of the temperature. The valve temperature signal is monitored to detect a rate of change in the temperature. The internal pressure of an inlet pressure line is sensed, connected to the internal flow passage upstream of the valve seat. A line pressure signal is generated representative of the internal pressure. The line pressure signal is compared against at least one expected line pressure value to determine a line pressure status. Operational status of the pressure relief valve is determined based at least in part on the detected rate of change of the fluid temperature and at least in part on the determined line pressure status.

19 Claims, 5 Drawing Sheets

(51) Int. Cl.
*F16K 37/00* (2006.01)
*G01F 1/74* (2006.01)
*G01F 25/00* (2006.01)
*F16K 17/04* (2006.01)
*G01D 21/02* (2006.01)

(56) References Cited

U.S. PATENT DOCUMENTS

| | | |
|---|---|---|
| 5,564,673 A | 10/1996 | Pieren |
| 5,623,962 A | 4/1997 | Danzy et al. |
| 5,725,015 A | 3/1998 | Theodos et al. |
| 5,774,372 A | 6/1998 | Berwanger |
| 6,283,138 B1 | 9/2001 | Friend et al. |
| 8,000,909 B2 | 8/2011 | Danzy |
| 2004/0168510 A1* | 9/2004 | Wakahara et al. ........... 73/118.1 |
| 2004/0197624 A1 | 10/2004 | Wheat et al. |
| 2005/0125166 A1 | 6/2005 | Loose et al. |
| 2009/0000406 A1 | 1/2009 | Brazier et al. |
| 2010/0106434 A1 | 4/2010 | Killion et al. |
| 2010/0280788 A1 | 11/2010 | Bohan et al. |

FOREIGN PATENT DOCUMENTS

| | | |
|---|---|---|
| JP | H01109235 A | 4/1989 |
| JP | 2003035621 A | 2/2003 |
| WO | 97/44645 | 11/1997 |
| WO | 2004/036327 | 4/2004 |
| WO | WO 2010/138321 | 12/2010 |

OTHER PUBLICATIONS

International Search Report and Written Opinion of the International Searching Authority issued in International Application No. PCT/US2010/034953; Aug. 31, 2010; 11 pages.

Valve Monitoring Device, Crosby/Tyco Flow Control; 1996 Anderson Greenwood Crosby, 6 pages.

Unofficial English translation of a JP Office Action dated Mar. 4, 2014 issued in connection with corresponding JP Application No. 2012-513097.

* cited by examiner

| | Operation 1 | | Operation 2 | | Operation 3 | |
|---|---|---|---|---|---|---|
| | dT/dt (open) | | dT/dt (open) | | dT/dt (open) | |
| T1 | 4.3  470 | | 4.5  475 | | 3.6 | |
| T2 | 2.8 | | 3.6 | | 1.9 | |
| | OP | SP | OP | SP | OP | SP |
| P1 | 432 | 450 | 350 | 450 | 405 | 450 |
| P2 | 220 | 243 | 120 | 243 | 205 | 243 |

FIG. 4B

SYSTEM AND METHOD FOR MONITORING AND CONTROLLING PRESSURE RELIEF VALVE PERFORMANCE

CLAIM OF PRIORITY

This application is a continuation application under 35 U.S.C. §120 of U.S. patent application Ser. No. 12/473,105, filed May 27, 2009, now U.S. Pat. No. 8,000,909, issued on Aug. 16, 2011, the entire contents of which is incorporated by reference as if fully set forth herein.

TECHNICAL FIELD

This document relates to pressure relief devices, and more particularly devices and systems for monitoring and controlling pressure relief valve performance.

BACKGROUND

Pressurized systems, including pressure vessels, piping, and other systems are often equipped with pressure relief devices to protect systems from overpressure conditions. Overpressure conditions can arise from a process error, instrument or equipment failure, fire, or other malfunction, which causes the pressure of the fluid in the system to increase above predefined parameters. As used herein, the term fluid may encompass liquid, vapor, gas, or a mixture of any of these fluid phases. Pressure relief devices may include a variety of different types, sizes, and configurations. For example, pressure relief devices can be self-actuated in that the device detects an overpressure condition and opens to release excess pressure from the system. In some cases, pressure relief devices are set to remain closed at a particular pressure setting. When the internal pressure of the line exceeds the predefined pressure setting, the pressure device can be forced open by the internal pressure, allowing excess pressure to escape the relief device. When the internal pressure of the lines and/or vessels of the system normalizes or otherwise returns to an acceptable level, the pressure relief device can return to its closed, sealed state, until the next overpressure state is reached and/or detected. A number of pressure relief devices are known in the art. Pressure relief devices, or pressure safety valves, can include, but are not limited to pilot-operated relief valves, spring-, electromagnetic-, and pneumatic-driven valves.

Pressure relief devices can be monitored to indicate the occurrence of overpressure conditions within a system. Additionally, monitoring systems have been employed to monitor the performance of pressure relief devices themselves. Typical monitoring systems employ position sensors, such as position transducers, to detect movement within the pressure relief device, indicating that the seat of the device has been displaced and the valve opened. Other monitoring devices in the art employ ultrasonic devices for detecting sounds and vibrations associated with the release of fluid from the relief device as well as the mechanical opening of the valve.

SUMMARY

Disclosed are methods, systems, and programs for monitoring operation of one or more pressure relief valves, each relief valve containing an internal flow passage with a valve seat and valve plug disposed therein. The temperature of a fluid can be sensed in the internal flow passage downstream of the valve seat. A valve temperature signal can be generated representative of the temperature of the fluid downstream of the valve seat. The valve temperature signal can be monitored to detect a rate of change in the temperature of the fluid downstream of the valve seat. The internal pressure of an inlet pressure line can be sensed, connected to the internal flow passage upstream of the valve seat. A line pressure signal can be generated representative of the internal pressure of the inlet pressure line. The line pressure signal can be compared against at least one expected line pressure value to determine a line pressure status. Operational status of the pressure relief valve can be determined based at least in part on the detected rate of change of the fluid temperature downstream of the valve seat and at least in part on the determined line pressure status.

Monitoring operation of one or more pressure relief valves can further include comparing the line pressure signal against at least one expected line pressure value in response to detection of a non-zero rate of change in the fluid temperature of the pressure relief valve body downstream of the valve seat. The line pressure signal can be compared to a value representing an expected operating pressure of the inlet pressure line. The line pressure signal can be compared to a value representing an expected set pressure of the pressure relief valve. The detected rate of change in the temperature of the fluid can be compared to a value representing an expected rate of change in temperature of fluid in the pressure relief valve when the pressure relief valve is in opened state. At least one of the values can represent an expected operating pressure or the value representing an expected rate of change in temperature of fluid in an opened pressure relief valve comprise a plurality of values, wherein in each value in the plurality of values corresponds to an operating state of the inlet pressure line. The valve temperature signal can be transmitted to a remote computer, wherein the valve temperature is monitored at the remote computer. The line pressure signal can be transmitted to a remote computer, wherein the internal pressure of the inlet pressure line is monitored at the remote computer.

In some aspects, the ambient temperature can be sensed outside of and in proximity to the pressurized inlet line. An ambient temperature signal can be generated representative of the sensed ambient temperature. The internal temperature signal can be compared to the ambient temperature signal to determine at least one temperature relationship. The detected rate of change in the temperature of the fluid in the pressure relief valve downstream of the valve seat can be compared against at least one expected rate of change value for the temperature of fluid in the pressure relief valve downstream of the valve seat. The line pressure signal can be monitored to detect a rate of change in the internal pressure of the inlet pressure line. The line pressure signal can be compared against expected line pressure values in response to detection of a non-zero rate of change one of the temperature of the fluid downstream of the valve seat or internal pressure of the inlet pressure line. A temperature flag can be set if a rate of change in the temperature of the fluid downstream of the valve seat is detected. A pressure flag can be set if a rate of change in the internal pressure of the inlet pressure line is detected. Determining operational status of the pressure relief valve can be based on whether a temperature flag or a pressure flag is set.

In another general aspect, a system for determining operational status of pressure relief valves can include a pressurized inlet line connected to an upstream end of an internal flow passage of a pressure relief valve, and a computing device. The inlet line can include a pressure sensor and a temperature sensor. The pressure sensor can be adapted to measure the internal pressure of a fluid in the pressurized line and convert the measured pressure into a representative inlet line pressure signal. The temperature sensor can be adapted to measure the temperature of a fluid in the internal flow passage downstream of a valve seat of a valve plug disposed in the internal passage and convert the measured temperature of the fluid into a representative downstream fluid temperature signal. The computing device can be adapted to determine line pressure status based on a comparison of the line pressure signal and at least one expected pressure value, a rate of change in downstream fluid temperature based at least on the downstream fluid temperature signal, and operational status of the at least one pressure relief valve based at least on the line pressure status and rate of change in downstream fluid temperature.

A system for determining operational status of pressure relief valves can further include a database adapted to store values of the line pressure signal and the downstream fluid temperature signal, wherein the computing device is adapted to access values stored in the database to determine operational status of the at least one pressure relief valve. The database can be adapted to store one of a temperature flag, in response to a detected non-zero rate of change in downstream fluid temperature, or pressure flag, in response to a detected non-zero rate of change in line pressure. The computing device can be further adapted to determine operational status of the at least one pressure relief valve based on whether the temperature flag or pressure flag is set.

In some aspects, the computing device can be remote from the at least one pressure relief valve, each pressure relief valve including a communication device adapted to communicate the internal temperature signal to the remote computing device. The computing device can be remote from the pressurized inlet line, the inlet line including a communication device adapted to communicate the line pressure signal to the remote computing device. The computing device can be adapted to determine an open state of the pressure relief valve based on a comparison of the rate of change in downstream fluid temperature and at least one expected temperature change value. The computing device can include a database storing at least one of the at least one expected pressure value or the at least one expected temperature change value. The at least one expected temperature change value can include at least an expected open valve rate of change. The at least one expected pressure value can include an operational pressure of the pressurized inlet line. The inlet line further can include a second temperature sensor adapted to measure the ambient temperature outside of and in proximity to the pressurized inlet line. The pressure relief valve can be a pneumatic, electromagnetic, pilot, or spring-operated relief valve. The computing device can be adapted to determine a rate of change in line pressure based at least on the line pressure signal and determine operational status of the at least one pressure relief valve based at least on the rate of change in line pressure.

In another aspect, the inlet line of a system for determining operational status of pressure relief valves can include a temperature sensor adapted to measure the temperature of a portion of the internal flow passage downstream of a valve seat of a valve plug disposed in the internal passage and convert the measured temperature of the portion of the internal flow passage into a representative valve temperature signal. The computing device can be adapted to determine a rate of change in temperature of the portion of the internal flow passage based at least on the valve temperature signal. Determining operational status of the at least one pressure relief valve can be based on the rate of change in temperature of the portion of the internal flow passage. The temperature sensor can be disposed on an interior surface of the internal flow passage or within an internal volume of the internal flow passage. The inlet line can also include a second temperature sensor adapted to measure the ambient temperature outside of and in proximity to the pressurized inlet line.

In another general aspect, monitoring operation of one or more pressure relief valves can include sensing the temperature of a portion of the internal flow passage downstream of the valve seat. A valve temperature signal can be generated representative of the temperature of the portion of the internal flow passage downstream of the valve seat. The valve temperature signal can be monitored to detect a rate of change in the temperature of the portion of the internal flow passage downstream of the valve seat. The internal pressure of an inlet pressure line can be sensed, connected to the internal flow passage upstream of the valve seat. A line pressure signal can be generated representative of the internal pressure of the inlet pressure line. The line pressure signal can be compared against at least one expected line pressure value to determine a line pressure status. Operational status of the pressure relief valve can be determined based at least in part on the detected rate of change of the temperature of the portion of the internal flow passage downstream of the valve seat and at least in part on the determined line pressure status.

In some aspects, the temperature can be sensed near a surface of the internal flow passage downstream of the valve seat. Sensing the temperature of a portion of the internal flow passage can include sensing the temperature of an internal fluid volume near the portion of the internal flow passage downstream of the valve seat.

The details of one or more embodiments of the invention are set forth in the accompanying drawings and the description below. Other features, objects, and advantages of the invention will be apparent from the description and drawings, and from the claims.

DETAILED DESCRIPTION OF ILLUSTRATIVE EMBODIMENTS

Pressure relief devices, such as pressure relief valves, are valuable elements within pressurized systems. Not only do pressure relief valves function to regulate overpressure conditions within pressurized systems, but pressure relief devices can be monitored at a more macro level to detect the cause of over-pressure conditions as well as other performance issues within the system. Monitoring of a relief valve may indicate the valve is leaking and needs maintenance or that the valve may be opening at an improper pressure setting for the process system on which it is installed and may therefore need adjustment. A pressure relief device monitoring system can utilize temperature sensors to detect the release of fluid from the pressurized system through the pressure relief device. For example, the rate of change in temperature near the seat of a relief valve can be monitored and detected using the sensor, to identify an open pressure relief condition. These sensors, and signals generated from sensor readings, can be used to alert the system to fluid release at particular pressure relief devices. Pressure relief device temperature signals can be processed together with system internal pressure readings and other data to derive why fluid was released from the system as well as to detect equipment failure or malfunction of the pressure relief devices and other system components. The use of temperature and pressure sensing devices can allow pressure relief devices to be monitored without exclusive reliance on the use of prior art position detection or ultrasonic sensing devices typically used in prior pressure relief valve monitoring systems.

Figure 1:
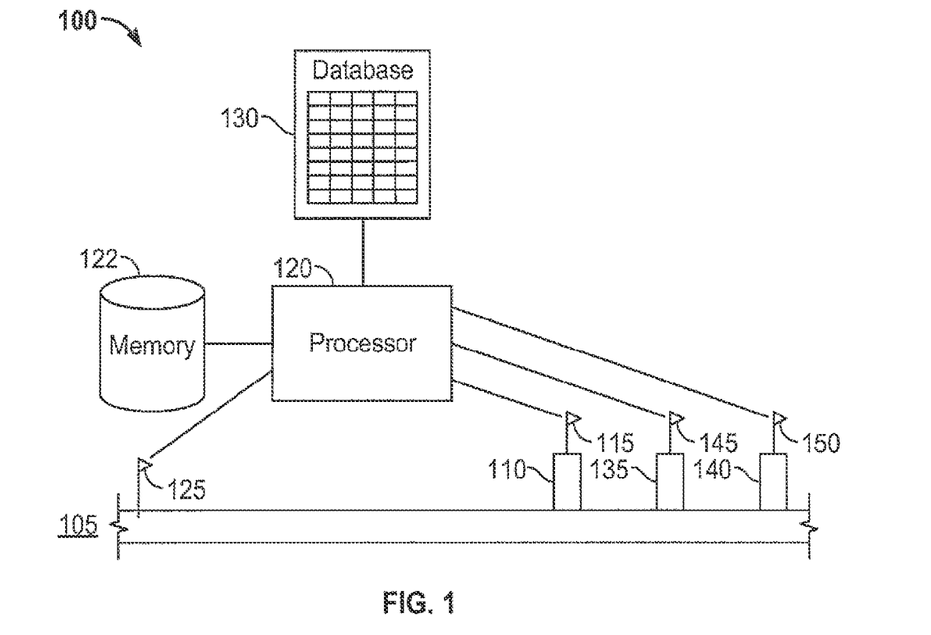
FIG. 1 is schematic diagram of a system for monitoring performance of pressure relief devices in a pressurized system.

Referring to FIG. 1, an example pressure relief device monitoring system 100 can include a pressurized system 105 having at least one pressure relief device 110. A pressurized system 105, in some instances, can have a plurality of pressure relief devices (e.g., 135, 140), for example where a system 105 maintains varied operating pressures across the system 105 or where the size of the system 105 lends itself to the inclusion of multiple pressure relief devices 110, 135, 140. A pressure relief device 110 can include, but is not limited to, pressure relief valves and pressure safety valves, as well as other devices capable of releasing fluid from a system in order to reduce pressure conditions within the system 100. Pressure relief devices 110, such as pressure relief valves, can include pilot-operated relief valves, spring-, electromagnetic-, and pneumatic-driven valves, as well as valves employing alternative functionality. Each relief device can include a temperature sensor 115, 145, 150, capable of measuring the temperature of a portion of the relief device 110 or a fluid in an internal volume of the relief device.

Figure 2A:
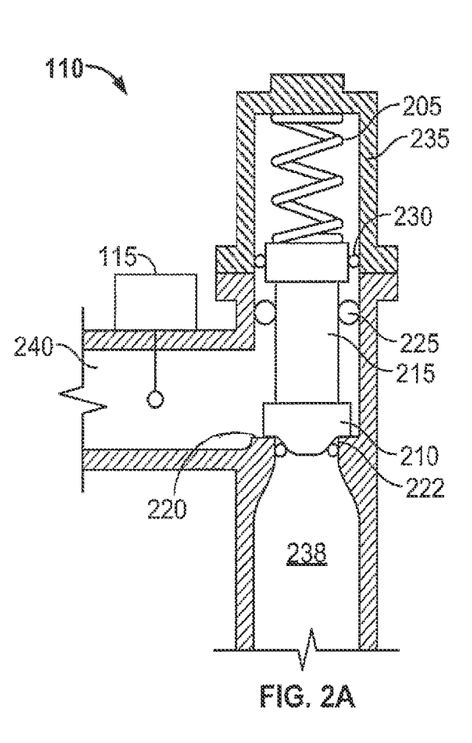
FIG. 2A illustrates a schematic diagram of an example pressure relief device in a closed state.
Figure 2B:
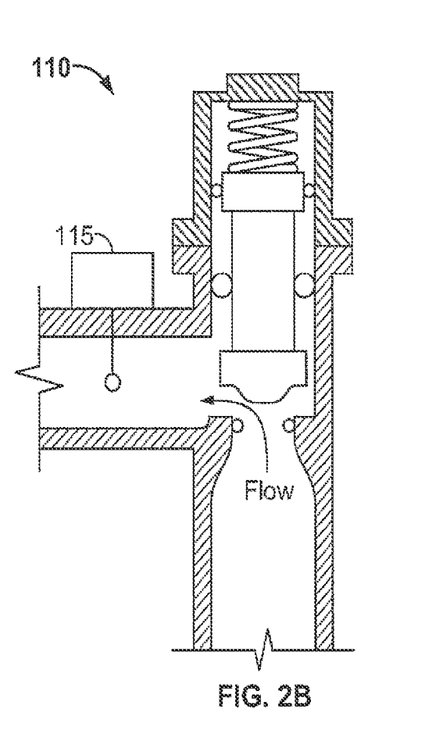
FIG. 2B illustrates a schematic diagram of an example pressure relief device in an open state.

FIG. 2A illustrates an example pressure relief valve 110 in its closed state. This instance of the pressure relief valve 110 connects to the system 105 at a flow passage 238. The relief valve 110 can be self-actuating and include a spring 205, or other resistive device, applying a force on a plug 210, through a stem 215, plugging a main seat 220 in the valve's closed state. The seat 220 may include a seal area 222 of elastomeric or hardened material as required by the valve application. The plug 210 and seat 220 function, disengaging and unsealing (as shown in FIG. 2B) to allow the release of fluid from the pressurized system 105 and reengaging to seal the valve 110 (as illustrated in FIG. 2A). Additional seals 225, 230 can also be provided within the body 235 of the relief valve 110 to seal components of the valve 110, such as the spring 205, from contact with fluids that may be released from the system 105 in the valve's open state, as illustrated in FIG. 2B. When the pressure within the system 105 exceeds the valve's predetermined set pressure, the pressure of the system 105 applies a force on plug 210 exceeding the downward force applied on the plug 210 by spring 205. As a result, the plug 210 is lifted from the seat 220 allowing fluid from the system 105 to escape through a downstream, internal flow passage 240, or outlet, of the valve 110. In the relief valve's 110 open state, fluid can be released until the pressure of the system 105, acting on the plug 210, decreases and is overcome by the force of the spring 205, resulting in the plug 210 re-displacing to the closed position, closing the valve 110, as shown in FIG. 2A. FIGS. 2A and 2B are examples of one type of relief device.

Other types of relief devices and valves are fully compatible with the teachings of this invention and are considered part of this disclosure.

In the examples of FIGS. 2A and 2B, a temperature sensor 115 is included to measure temperature at the valve 110. Temperature sensors can include thermocouples, thermisters, infrared, and other temperature sensing devices. In the implementation illustrated in FIG. 2A, the temperature sensor 115 is positioned to measure the temperature of fluid within a volume in outlet 240, immediately downstream from the seat 220. In other implementations, the temperature sensor 115 can be positioned to measure temperature of a portion of the valve structure itself, for example an inner wall of outlet 240. Additionally, in some implementations temperature sensors 115 can be provided to measure a temperature of a fluid volume immediately upstream from the seat 220, in flow passage 238. Further, a plurality of sensors can be used in combination, for example to measure a temperature difference upstream and downstream of the plug 210, to detect a change in temperature in the relief device 110 corresponding with the release of fluid through the device 110. Indeed, in some implementations, an additional temperature sensor can be provided to measure ambient temperature in a volume surrounding a portion of the relief device 110, for example near the relief valve outlet 240.

Returning to FIG. 1, data collected by the temperature sensor 115 can be collected and communicated to a processor 120. The processor 120 can use this data to derive rates of change in temperature, alert notifications, and other diagnostic results. Additionally, deriving diagnostic results, such as calculating a rate of change in temperature, may include sampling sensed temperature and pressure values from the sensor 115 at predisposed time intervals, requiring near constant operation of the sensor 115 and computer processing devices 120 tasked with gathering the sampled data and calculating rate of change based on the predisposed interval. In some implementations, a processor 120 may also include memory 122, for storing received sensor data. For example, in some implementations, in order to calculate a rate of change of a sensed value, it may be necessary to store preceding values in memory 122 for comparison with the more recently captured values to determine the change in value from one interval to the next. Memory 122 can also be used to derive trends, produce reports, or calculate other diagnostic values in connection with historical system performance using larger data samples captured over longer term.

In some implementations, the processor 120, as well as memory 122, may be remote from the temperature sensor 115, for example located at a central, remote computing device. In other implementations, the processor 120 can be distributed. For example, in some limitations, some processing functions can be carried out at a processor located on the temperature sensor 115 while other processing functions can be carried out at a centralized processor. For instance, a temperature sensor 115 may be adapted to process temperature readings to calculate a rate of change in temperature. This computer rate of change can then be communicated to a centralized computing device, for further processing and monitoring, for example, in connection with other data received from other relief devices and system 105 components. In still other examples, all processing for each sensor or component can be carried out using a processor 120 located at the component.

In implementations employing a remote processor 120 or remote processing functionality, temperature sensors 115 can be further adapted to communicate temperature data, calculations, or alerts to the remote computing device. Temperature sensors may communicate data to remote computing devices using a hardwire or optical line or wireless communication protocol, such as WiFi, Bluetooth, or a wide-area cellular telephone network. Temperature sensors 115 can be adapted to communicate data directly to the remote computing device or over a network, for example a local area network, private network, virtual private network, or a distributed, public or global network, such as the internet.

In other possible implementations, a tiered processing arrangement can be employed including an intermediate processor. The intermediate processor can be located at a facility proximate to or remote from the monitored pressurized system and adapted to gather data from sensors, processes, and other processors. Processed and raw data gathered by an intermediate processor can be further processed by the intermediate processor or forwarded then to other processors or facilities. For instance, data can be forwarded from an intermediate processor to a centralized monitoring and control location. In some instances, a centralizing monitoring and control location can monitor multiple pressurized systems at various remote locations.

As shown in FIG. 1, additional sensors (e.g., 125) can be provided in connection with the pressurized system 105. For example, a pressure sensor 125 can be provided in pressurized system 105 for measuring the internal pressure of a line or vessel of the pressurized system 105 or a subsystem thereof. The pressure sensor can be a fiber optic pressure sensor, microelectromechanical (MEMS), piezoelectric sensor, mechanical deflection device, strain gauge, or other pressure sensing device capable of measuring fluid pressure in the pressurized system 105 and within components of the system 105. In some implementations, a plurality of pressure sensors 125 can be provided in system 105. Further, in some instances, pressure sensors 125 can be provided so as to be positioned near or otherwise correspond to pressure relief devices 110 in the system. In other examples, a plurality of pressure sensors 125 can be provided to obtain and average pressure measurements across the system 105 or to correspond with a plurality of subsystems in the system 105.

Like the temperature sensor 115, additional sensors, including pressure sensor 125, can communicate readings to a processor 120 using wireline, optical line, or wireless communication technologies. Processing can take place at the individual sensors or may be centralized in a local or remote computer processing device 120. A centralized computer processing device 120 can accept communicated temperature, pressure, and other readings and combine these data points during processing to derive diagnostic values and conclusions. For example, a calculated rate of change in temperature based on temperature readings from a relief device can be compared against pressure values for the system to determine whether a relief device is open and releasing fluid from the system. A detected open condition may indicate that the relief device 110 is functioning correctly to relieve an overpressure condition in the system 105 or that the relief device is leaking or otherwise malfunctioning. Likewise, a decrease in pressure or pressure higher than a relief device's set pressure may indicate that a relief device is open, has recently opened, or should be opened.

In addition to a processor 120, some implementations of system 100 can include a database 130, capable of storing data representing expected system performance data as well as other values and constants that can be accessed and used by processor 120 in monitoring and deriving results from received temperature, pressure, and other readings from sensors in system 100. For example, the processor 120 can compare temperature and pressure signals derived from temperature and pressure sensing devices against expected values for the system 105, as stored in database 130. In other instances, processor 120 can store these expected values and constants locally, for example by hard-coding the constants in memory, software, or firmware employed by the processor 120. However, employing database 130 can be advantageous, in that it allows for dynamic storage and management of system 105 data, including arrays of expected values, variables, and constants for access and use by the processor 120. Additionally, database 130 can allow system managers, in some instances, to more easily supplement and modify expected values, variable, and constants used by the processor 120, for example to reflect corresponding modifications made to the underlying physical system 105 to which these expected values and constants apply.

The database 130 can store a set of values representing the expected internal pressure of the system 105, or an expected valve temperature rate of change, during a given operational condition of the system 105. The database 130 can additionally associate these values, or constants, with particular subsystems, piping, vessels, or relief devices 110 within the system 105, as well as particular operating conditions of the system. In some instances, system 105 can operate under varying conditions depending upon the process, fluids, ambient environment, and other conditions influencing the operation and thermodynamic characteristics of the system 105. Accordingly, database 130 can store and associate a plurality of values with a single system element, each value in the set of values corresponding to a particular operating condition of the system 105. For instance, some pressurized systems can have multiple operating states, for example, with fluids of different types or phases channeled through the pressurized lines of the system at different times or process cycles. A fluid in the system during one operating state can have, for example, an expected temperature rate of change that is different from other that of fluids in the system during other operating states. One example is a system that channels water through the system during one operating state and steam during a second operating state. Accordingly, distinct expected values can be stored in the database 130 for each of the fluids or operating states of the system. Depending on the current operating condition of the system 105, the database 130 can return those particular expected values corresponding to the current operating condition, allowing the system 100 to compare detected pressure and temperature readings against more precise, state-specific expected values, allowing the processor 120 to make more accurate determinations regarding the current status and operation of the system 105.

Figure 3A:
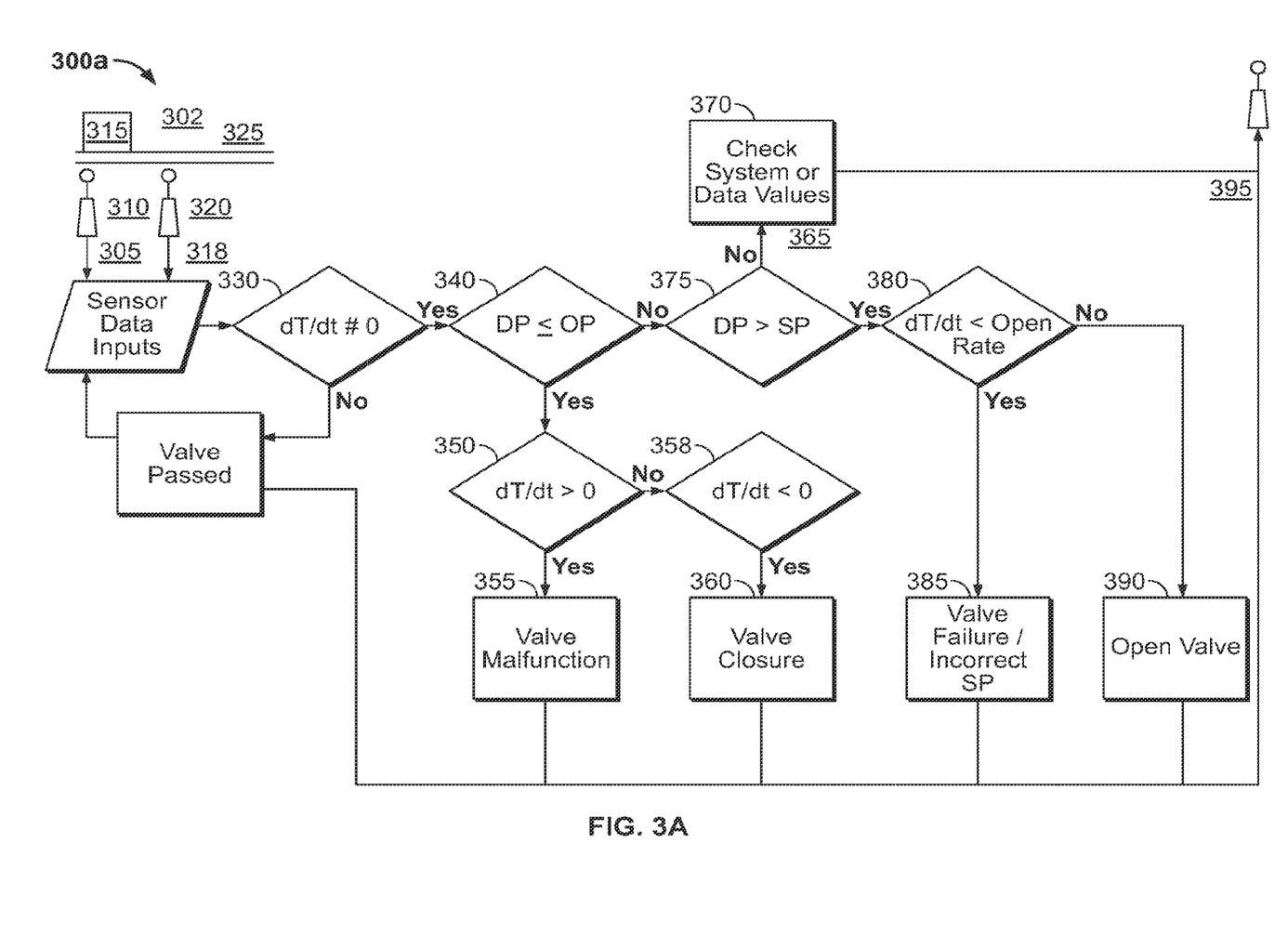
FIG. 3A is a flowchart of a first example technique for monitoring performance of a pressure relief device.

Systems, such as system 100 illustrated and described in connection with FIG. 1, can be used to perform techniques and algorithms to access and monitor the performance of a pressurized system (e.g., 105) and pressure relief devices (e.g., 110) employed in the pressurized system. FIG. 3A is a flowchart 300a illustrating one example technique for monitoring the performance of a pressurized system and associated pressure relief devices. Temperature data can be received 305 from temperature sensors 310 measuring temperature at pressure relief devices 315 and pressure data can be received 318 from pressure sensors 320 measuring pressure in an inlet line 325 of a pressurized system 302. The temperature at a pressure relief device, for example at a volume downstream from a seat of the relief device 315, can be monitored 330 for detection of a non-zero change in temperature (dT/dt) at the relief device. In an inlet line 325 containing substantially incompressible process fluid, warmer than the fluid (e.g., air) downstream from the pressure relief device 315, a positive change in temperate can indicate that the pressure relief device is open or leaking, releasing the warm fluid and bringing it in contact with the temperature sensor 310. Where a negative change in temperature is detected in the warm, incompressible fluid system, a determination can be made that a relief device, once open, has recently closed. Contrarily, if the pressurized system 105 includes a warm, compressible process fluid, a negative change in temperature detected downstream of the relief device 315 may indicate that the valve is open and/or leaking due to thermodynamic effects of a temperature drop in conjunction with a pressure drop in the compressible process fluid across the valve seat when the valve is open and the compressible fluid is flowing through the valve.

Alternatively, in cold or cryogenic fluid systems, a negative change in temperature at the pressure relief device 315 can indicate an open or leaking relief device 315, positive temperature changes indicating the closure of the pressure relief device.

Thermodynamic properties of the process fluid may be stored in a database (e.g., 130) such that when a non-zero change in temperature is detected, inlet line pressure data can be analyzed or collected at or near the time of the detected change in temperature to further diagnose the cause of the detected change in temperature. In other implementations, such as that illustrated in FIG. 3B, additional or substitute readings, determinations, or calculations can trigger further processing in lieu of or in addition to a detected change in temperature. For example, an ambient temperature (AT) reading, corresponding to a volume near the relief device 315, may be received 333 and compared 335 with temperature (T) data detected and received 305 from sensors 310 at the relief device 315. For instance, in a pressurized system utilizing a fluid warmer than the ambient temperature (AT) surrounding the relief device 315, if the measured relief device temperature T is greater than the measured ambient temperature AT, this may indicate that the relief device has opened. Other readings may also be used to trigger or begin processing directed at diagnosing the functional status of a pressurized system or relief device, for example using a measurement of temperature upstream and downstream of a plug of a pressure relief device.

Figure 3B:
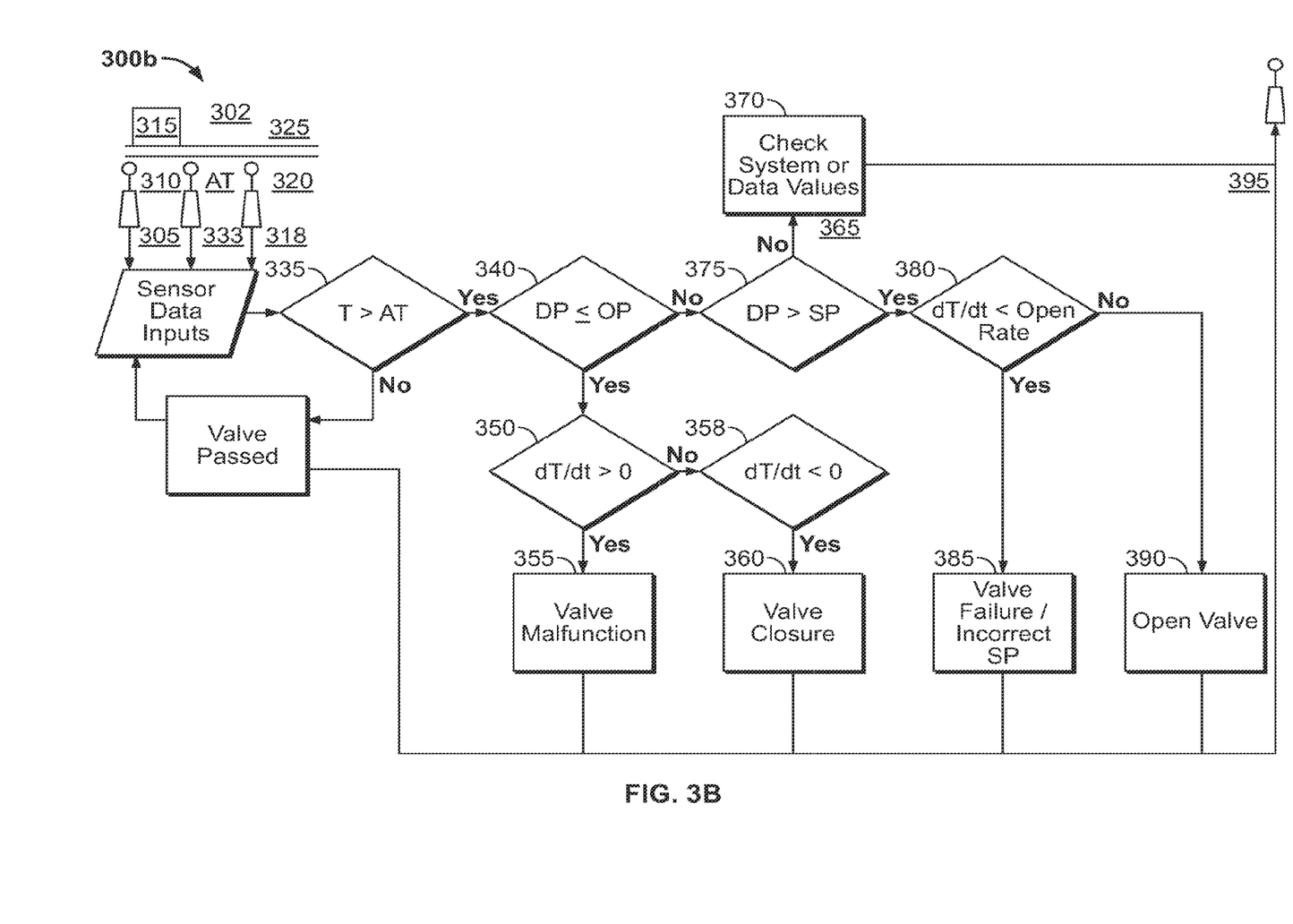
FIG. 3B is a flowchart of a second example technique for monitoring performance of a pressure relief device.

In the examples of FIGS. 3A and 3B, once a temperature change 330 (or temperature imbalance 335) has been detected, further processing of temperature and pressure data collected from the pressurized system, can be initiated. For example, inlet line pressure data can be compared with an expected value for the pressure in the inlet line 325. A comparison of line pressure with an expected value can indicate that the pressure in the line 325 is higher or lower than expected, as well as indicate that the pressure in the line 325 is reaching, or has reached, a point where one or more pressure relief devices 315 will open, releasing fluid from the line 325. The line pressure reading can be compared, for example, with an expected value for the corresponding operating pressure (OP) 340 of the inlet line and/or the set pressure (SP) 375 of the pressure relief device 315. In one example, if a line pressure reading, taken at or near the time of the detected temperature change, is lower than the operating pressure 340, a determination can be made relating to the operation of the relief device 315. For instance, in a warm fluid system, if a positive temperature change was detected 350, a determination can be made 355 that the relief device 315 is leaking or otherwise malfunctioning and releasing fluid from the line 325. If the change in temperature was negative 358, in this example, a determination can be made 360 that the pressure release device 315 has recently closed.

In some instances, the line pressure reading and comparison, may indicate that the line pressure reading is higher than the operating pressure but lower than set pressure 365, allowing further determinations can be made 370. For example, a determination can be made 370 that the expected value for operating pressure is incorrect, that the actual operating pressure is too high, or that the expected set pressure value is too low and/or that the actual set pressure of the device does not match the expected set pressure value. If, on the other hand, the detected line pressure is higher than the expected set pressure value 375, further determinations can be made regarding the performance of the relief device. For instance, if the rate of temperature change is less than an expected rate of temperature change when the relief device 315 is open and operating correctly 380 (or less than the relief device's "open rate"), a determination can be made 385 that the relief device set pressure is incorrect (i.e., too low) or that the pressure relief device is malfunctioning or has failed. If however, the rate of change in temperature equals or exceeds the expected rate of change in temperature for an open pressure relief device 380, a determination can be made 390 that the relief device 315 is open and operating correctly.

Figure 3C:
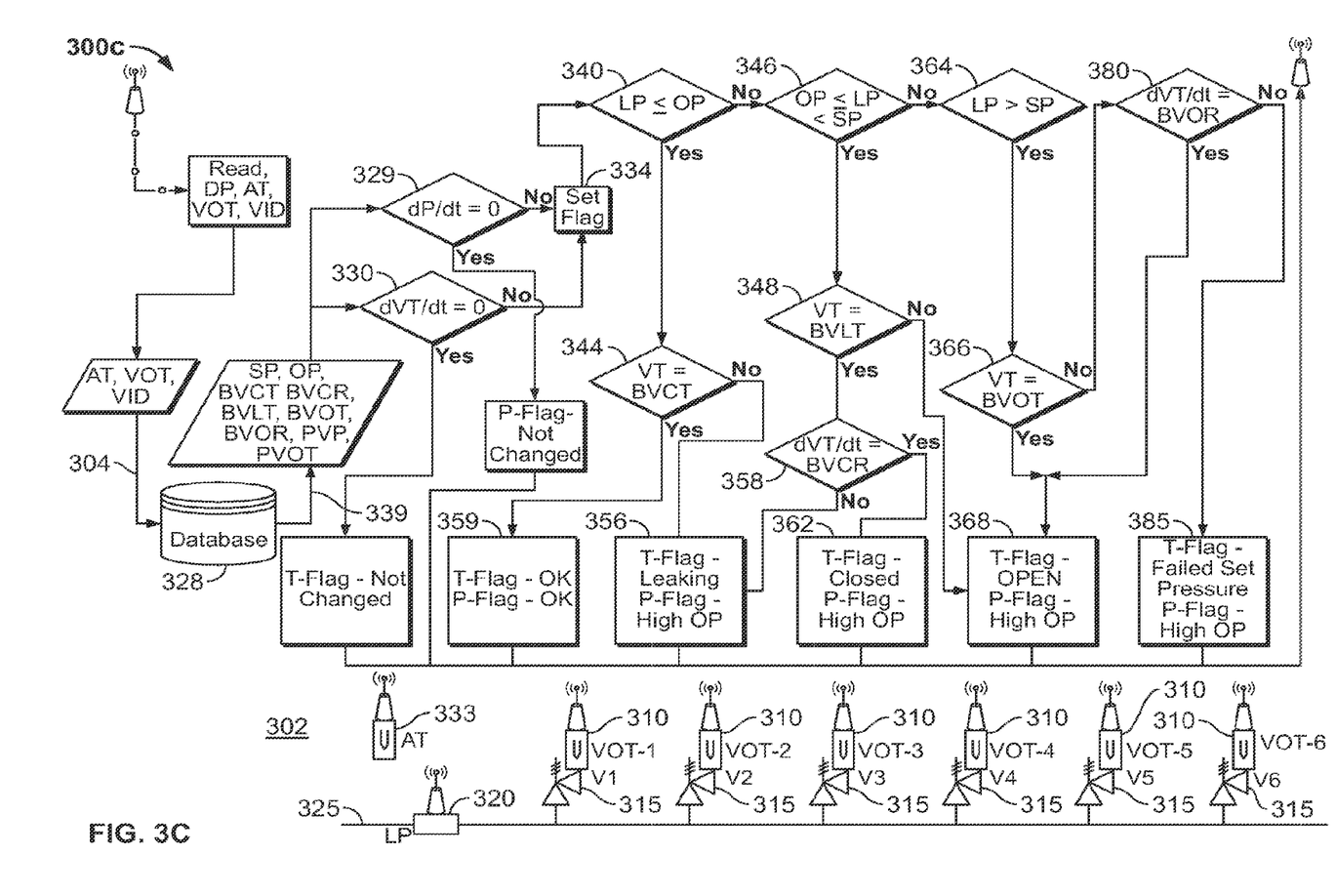
FIG. 3C is a flowchart of a third example technique for monitoring performance of a pressure relief device.

Further provisions and processing steps can be incorporated to increase the accuracy of diagnoses made concerning relief devices and the pressurized system 302 generally. For instance, FIG. 3C illustrates another flowchart 300c showing an alternative example technique for monitoring the performance of a pressurized system 302 and associated pressure relief devices 315. Similar to the techniques illustrated and described in connection with FIGS. 3A and 3B, temperature sensors 310 measuring temperature at pressure relief devices 315 and pressure sensors 320 measuring pressure in an inlet line 325 of the pressurized system 302 can collect and transmit temperature and pressure readings for processing. In some implementations, ambient temperature readings 333 can also be collected for use in processing. Detected pressure and temperature data can then be transmitted 304 to a database 328 for storage and retrieval 339 during processing. Database 328 can also store constants and expected values used in processing and benchmarking collected temperature and pressure data.

As in the examples of FIGS. 3A and 3B, abnormal sensor readings can trigger further processing and measurements to ascertain the cause of the abnormal reading. Indeed, as shown in FIG. 3C, abnormal line pressure readings, as well as abnormal relief device temperature readings can trigger further system data processing. For instance, as shown in FIG. 3C, the detection of an unexpected, non-zero change in line pressure 329 or relief device temperature 330 can trigger further processing. A non-zero rate of change can be determined, for example, by comparing two or more sequential values detected and retrieved from system sensors 310, 320. Where temperature (or pressure) data is digitally sampled and stored in database at a high rate of collection, it can be desirable to base a "detected" rate of change on more than two sequential values evidencing the change in temperature. For systems or sensors employing lower sampling rates, it may be sufficient to compare only two sequential values to determine a detected change. In some implementations, a non-zero rate of change can allow for some variance between sequential temperature and pressure values, before a "non-zero" result is determined, whereas, in more sensitive systems or systems employing low sampling rates, any variance between sequential values may trigger a non-zero result and further processing.

In the example of FIG. 3C, a non-zero rate of change in relief device temperature 330 can result in a temperature "flag" being set 334. Similarly, a detected non-zero rate of change in line pressure can cause a pressure flag to be set 334. A flag may be a binary flag, session key, or other value stored in the database 328 identifying the reason why additional processing was initiated. As will be described below, the basis for additional processing, as recorded by the set flags, can be used to further refine the diagnoses resulting from the processing. For example, a set temperature flag can dictate that resulting diagnoses assume that fluid has escaped the pressurized system through a relief device, influencing the temperature read by temperature sensors at the relief device. However, in cases where only the pressure flag is set, this can serve to support an assumption that either fluid has escaped and no temperature change sensed (e.g., due to a malfunctioning temperature sensor), or that some other pressure-related event has taken place. As an example, in the case of a malfunctioning temperature sensor, an open or leaking relief device will result in a detected drop in line pressure that is not detected by the temperature sensor. Other conditions can also arise, the pressure and temperature sensors, and corresponding pressure and temperature flag values, capable of being applied together to more accurately diagnose the cause of a pressure or temperature change.

Continuing with the example of FIG. 3C, a set temperature or pressure flag can trigger a comparison 340 of detected line pressure (LP) against an expected operating pressure value (OP). The line pressure value selected can be that value stored in the database 328 corresponding with or having a detection time nearest the setting of the temperature or pressure flag that initiated the processing. If the detected line pressure (LP) is equal to or less than a stored expected operating pressure (OP) value, a further comparison 344 can be made, comparing a contemporary, detected valve temperature (VT) value with an expected baseline closed valve temperature constant (BVCT). The BVCT value can represent the expected temperature value at a relief device when the device is closed. In instances when only a pressure flag is set during processing, and detected valve temperature (VT) equals or approximates BVCT, it can be determined that the relief device is closed and working properly 359.

In some instances, comparison 344 can be skipped, for example, where only a temperature flag is set. A set temperature flag indicates that a change in temperature has occurred. Thus, in some instances, a comparison 344 of detected temperature with an expected temperature value for a closed valve could often be unnecessary. However, carrying out the comparison 344 during a set temperature flag can nonetheless be useful, first, to corroborate or validate the nature of the non-zero rate of change, or to catch instances where the non-zero rate of change, while measurable, was lower than would be expected for an actual relief device leak or malfunction. Where the detected temperature is equal to or within an acceptable range of BVCT, it can be determined that the relief device is working properly 359, even when a temperature flag is set. If, however, the detected valve temperature does not equal or approximate BVCT, an alternative conclusion 356 can result. For instance, if the temperature flag is set, it can be determined 356 that the relief device, corresponding to the set temperature flag, is leaking. If, however, only the line pressure flag is set, it can be similarly determined 356, for example, that the actual operating pressure of the system or line is too high and that the relief device continues to function properly.

In other instances, the detected line pressure will be higher than the expected operating pressure. If this is the case, detected line pressure can be further compared 346 against an expected value of the set pressure (SP) of the relief device. If the detected line pressure is greater than the expected operating pressure but lower than set pressure, a comparison 348 can be made between the detected valve pressure and the expected baseline valve leaking temperature (BVLT) for the valve. The baseline valve leaking temperature can be a constant indicating an expected temperature downstream from a leaking relief device outlet. For pressurized systems with fluids hotter than the system's ambient environment, BLVT will be higher than BVCT, because leaking fluid will result in warmer temperature than when the relief device is closed. BVLT, in a warm fluid system, however, will be cooler than an expected baseline open valve temperature (BVOT) constant for a valve, in that an open relief device will be outputting greater volumes of warm fluid into the area measured by the relief device temperature sensor.

If the detected relief device temperature is equal to or within an acceptable range of the BVLT further comparisons 358 can be triggered. For instance, depending on the sampling rate of the sensors 310, 320, an abnormal pressure or temperature condition can be identified that further appears to be the result of a leaking relief device. While this may, in fact be the case, other alternative causes for the abnormal reading may be possible. For example, if a relief device opens quickly and is in the process of closing at the time of a temperature and/or pressure reading, the measured temperature (in a warm fluid temperature) may be higher than normal, and changing at a non-zero rate, the pressure in the line slightly higher than normal, but lower than would be expected for an open condition. In order to determine that the relief device is leaking, and rule out the possibility that these readings resulted during perfectly proper operation of the relief device (e.g., a valve closing), the detected rate of temperature change (or in some instances rate of pressure change) can be compared 358 against a value of an expected rate of change for a normal closing of the relief device. During a set temperature flag condition, if the detected rate of change is equal to or approximates what would be expected for a properly closing relief device (baseline valve closing rate (BVCR)), a conclusion 362 can be reached that the relief device was in the act of closing when the flag(s) was set. If the rate of change does not equal the expected value, it can be determined that the relief device is leaking 356. However, when the pressure flag is the only flag set, a determination can be made 356, 362 that a high operating pressure is responsible for the abnormal pressure reading.

Finally, if the detected line pressure is greater than set pressure 364, other further comparisons can be made between detected values and stored expected values. For example, detected temperature can be compared 366 against an expected baseline relief device temperature value (BVOT) when the relief device is in open condition. If the temperature flag is set and the detected temperature value is equal to or approximates the expected open temperature value (BVOT), a determination 368 can be made that the relief device has opened, as designed, to release fluid in an overpressure condition. If only the pressure flag is set, and no leaking fluid has been detected by an abnormal temperature change at a relief device outlet, an alternate conclusion 368 can be reached— that the operating pressure of the system is too high. If detected temperature is lower than BVOT, however, an additional comparison 380 can be conducted, comparing the detected rate of change in temperature against an expected rate of change when the relief device is open (BVOR). If the temperature flag is set and the detected rate of change is equal to or approximates the expected rate of temperature change for an open relief device (BVOR), it can again be determined 368 that the relief device has opened correctly, due to the line pressure exceeding set pressure of the relief device. If, however, the detected temperature and rate of temperature change both do not agree with what would be expected for a properly-functioning, open relief device, an alternative conclusion can be made that the relief device is malfunctioning 385. If the temperature flag is not set, again an alternative determination can be made that operating pressure is too high 385 in the pressurized system line.

In addition to the examples described above, additional determinations can also be generated based on temperature and pressure data received from temperature and pressure sensors operating in connection with a relief device or inlet line. Indeed, in some implementations, additional diagnostic steps can be performed based on or triggered by another, earlier determinations or diagnoses. For instance, a determination that a relief device has opened and is operating properly can trigger monitoring of a subsequent change in relief device temperature, indicating and confirming that the relief device has correctly returned to its closed state. As another example, where a malfunction or other abnormal operating condition or state is detected in a relief device, additional or closer monitoring or diagnostic steps can be performed on the targeted device to determine the cause of the abnormal reading. For example, non-temperature or non-pressure related monitoring can occur, for example supplemental readings including those from ultrasonic, audio, or plug displacement sensing devices. Additionally, in systems employing multiple pressure relief devices, a determination of a particular operating condition in one pressure relief device, such as an open state, can trigger comparison of operating behavior, temperature and pressure data of that device with other relief devices, lines, vessels, or subsystems in the system. For instance, where open conditions 390 or incorrect expected values or operating pressures are determined 385 concurrently at multiple pressure relief devices, additional determinations can be made relating to system- or subsystem-wide performance.

In each of the examples described in FIGS. 3A-C, determinations regarding the operation and performance of the inlet line 325 and relief device 315 can be communicated 395 to (or within) a computing device or alert system allowing the detected operational condition to be displayed, recorded, or otherwise prepared for presentation to a user or manager of the pressurized system. In some implementations, one or more computing devices, each having a processor, can perform one or more steps in the example diagnostic techniques illustrated in FIGS. 3A-C, together with related presentation or recording of the generated data and determinations (e.g., 355, 360, 370, 385, 390). For example, the diagnostic steps illustrated in FIGS. 3A-C can be encoded in a machine-readable medium, such as volatile or non-volatile memory including, without limitation, magnetic media, optical media (such as CD ROM, DVD-ROM, or Blu-ray disks), random access memory (RAM), read-only memory (ROM), EPROM, EEPROM, and flash memory devices, removable media, or any other suitable local or remote memory component. Instructions stored in the machine readable media can be read by a computing device or other device having a processor capable of reading the machine instructions and performing the corresponding operations and functions.

Figure 4A:
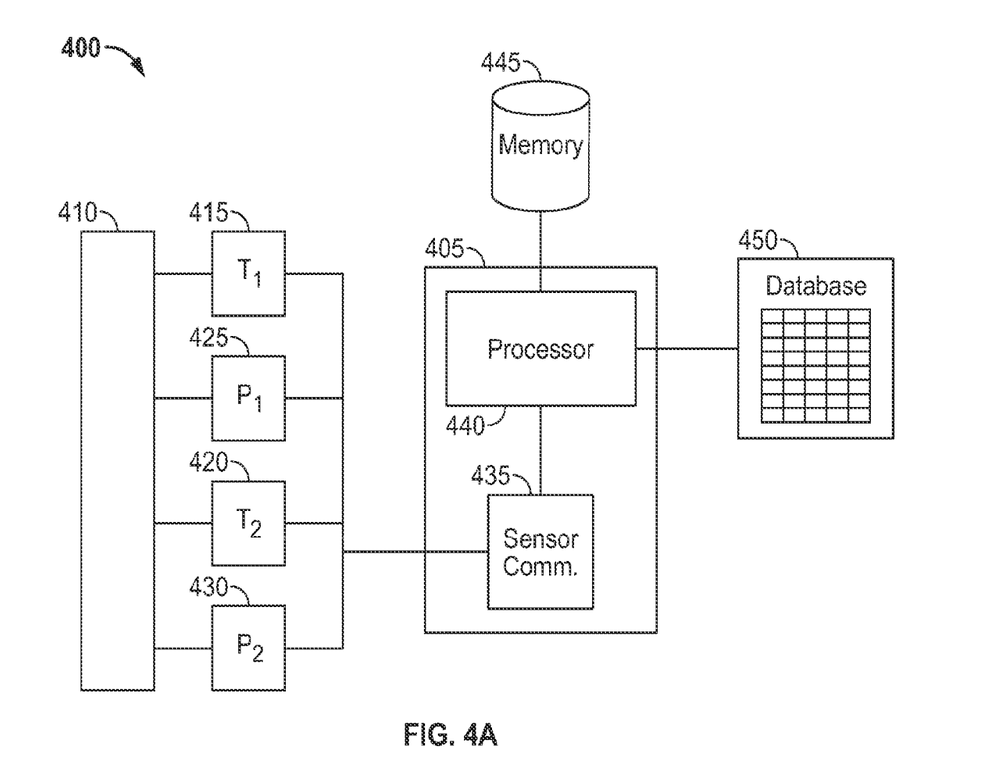
FIG. 4A is a schematic diagram of a decentralized system for monitoring a pressurized system.

FIG. 4A is a schematic diagram 400 illustrating an example computing system 405 adapted to diagnose and monitor the operating conditions and performance of a pressurized system 410 including at least one pressure relief device. In this example, pressurized system 410 includes a plurality of sensing devices, including at least one temperature sensing device (e.g., 415, 420) capable of being used in the derivation of a rate of change in temperature at a pressure relief device. Additionally, pressurized system 410 can also include at least one pressure sensing device (e.g., 425, 430) capable of producing a pressure reading for an inlet line or vessel connected to at least one of the pressure relief devices. Temperature signals, representative of the detected temperature, or change in temperature at the pressure sensing devices, can be communicated from the temperature sense devices 415, 420 to a sensor communication module 435. Similarly, pressure signals, representative of detected pressure within an inlet line, can be communicated from the pressure sense devices 425, 430 to the sensor communication module 435. In some implementations, the sensor communication module 435 can both receive transmissions from and transmit communications to individual sense devices 425-435. For instance, in some implementations, a received (or calculated) non-zero change in temperature based on a temperature sensor reading (e.g., 415) can trigger a request, from the sensor communication module 435, for a contemporary pressure reading from a corresponding pressure sensor (e.g., 425).

The sensor communication module 435 can pass received sensor data to, or even instructions from, a processor 440. The processor 440 can perform functions, calculations, and operations necessary for allowing diagnostic algorithms, data calls, data recording, and other system 405 activities to be completed. For instance, processor 440 can download or upload received temperature and/or pressure data into a memory 445, for example, to recognize a change in temperature relative to an earlier-received temperature reading. Memory 445 may be sufficiently large to store expansive amounts of historical data, sensed data, or processor determination results for purposes of generating reports or performing trend analyses or other historical data processing.

In some implementations, such as in the example techniques of FIGS. 3A, 3B, and 3C, functions performed by processor 440 may require comparing received or manipulated temperature or pressure data with expected value data to generate diagnostic determinations based on the received data. In some examples, processor 440 may query a database 450 for expected value data, constants, scripts, and other data to be used in processing received sensor data. Database 450 can be, for example, managed by database management software (DBMS) such as MySQL, Oracle, IBM DB2, or others. In some instances, in addition to querying and accessing records in database 450, processor 440 can also create and modify records and other database data, for example, in connection with a determination made by the processor 440. For instance, it may be determined that an expected value is incorrect, such as an expected relief device set pressure value, based on a history of determined open conditions at pressures lower than the expected set pressure stored in the database 450. In response to this determination, processor 440 can issue a command to modify the expected set pressure value for the relief device to bring the expected set pressure value in-line with observed, historical data. Processor 440 can also be used to supplement or change expected values managed in database 450, for example, to reflect changes to equipment or processes in the physical, pressurized system, such as a new or repaired pressure relief device.

Figure 4B:
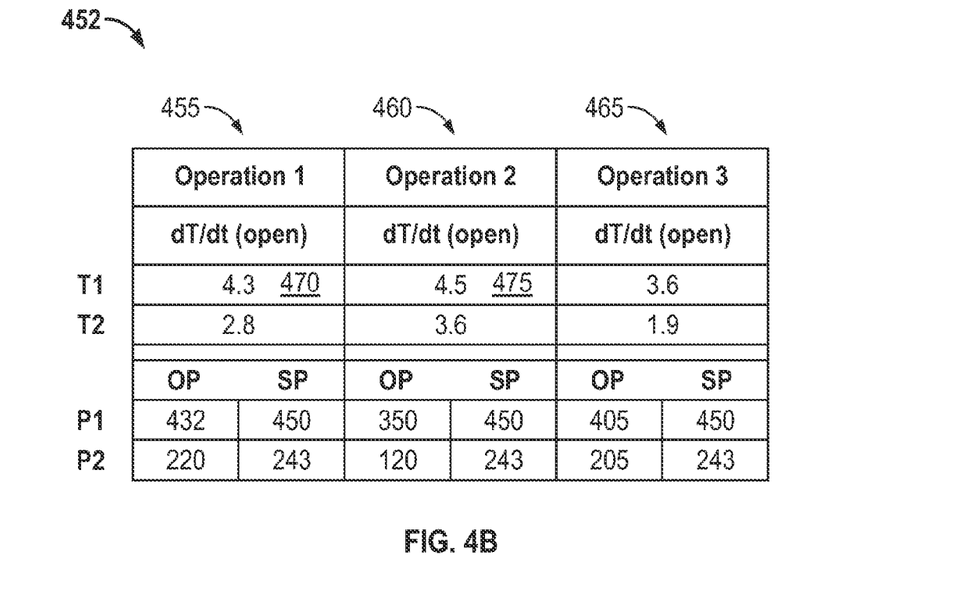
FIG. 4B is an example record of expected temperature and pressure values stored in an example database adapted for use with the system of FIG. 4A.

Turning to the example database record 452 illustrated in FIG. 4B stored in database 450, a database 450 can be useful for dynamically accessing and processing expected value records that vary across sub-systems, processes, and equipment. For instance, a pressurized system may include multiple pressure relief devices, for example, with each relief device corresponding to a separate vessel, line, or subsystem. In this example, a first subsystem includes a first pressure relief device and a second subsystem a second pressure relief device. A pressure sensor P1 in the first subsystem can be used together with a temperature sensor T1, measuring temperature at a first pressure relief device, to monitor operation of the first pressure relief device. Correspondingly, a pressure sensor P2 and temperature sensor T2 can be used in connection with monitoring the second subsystem and second pressure relief device. Additionally, in the example of FIG. 4B, the pressurized system 410 can be capable of operating in three distinct states 455, 460, 465. These distinct states 455, 460, 465 may utilize fluids of varying thermodynamic properties, and of different temperatures and different pressures, thereby affecting at least some of the expected values corresponding to the first and second relief devices and subsystems.

In the example illustrated in FIG. 4B, the pressurized system operates, in a first state 455, using a first fluid at first a pressure. In the second state 460, the fluid used remains at the same temperature as the fluid in the first state 455, but in this state, at a lower pressure. In the third state 465, a fluid is employed at an operating pressure OP nearer the operating pressure of the first state, but at a lower temperature than both the first and second states. The first, second, and third fluids can be the same fluid or different fluids. The pressure relief valve in the first subsystem has a set pressure almost twice as high as the set pressure of the second relief valve. Additionally, in this example, the physical set pressure of the relief valve is constant in each of the three operating states 455, 460, 465 and, as a result, the corresponding expected value for the set pressure of each relief device is also constant, as stored in the record 452. Given the differences in the make-up and performance of the first and second systems, the other expected values stored in the record 452 for the subsystems vary depending upon the operating state of the pressurized system. Accordingly, when the pressurized system is in a first operating state a signal or message can be transmitted to the computing device 405 alerting the computing device that the pressurized system 410 is operating in a first state. Consequently, when the processor 440 of the computing device 405 needs to access data from the database 450, the processor can send, in its database query, a value corresponding to the present operating condition of the pressurized system 410. For example, the processor 440 may submit a query to the database 450, during the first operating state 455, requesting retrieval of an expected open rate value for the first pressure relief device. The retrieved value can be used, for instance, to compare a retrieved non-zero temperature change reading to the expected open rate value. When requesting retrieval, the processor can query the database for the particular open rate value corresponding to the pressure relief device and operating condition of the system, in this example retrieving a value 470 of "4.3" from record 452. As operation of the pressurized system cycles, or otherwise adjusts, future database queries can take the new operating condition of the system into account. For example, if the operating state 455 ends and a second operating state 460 begins, a query for an expected open rate value for the first pressure relief device during the second operating state 460 could automatically return an open rate value 475 of "4.5," corresponding to the second operating condition 460.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method for monitoring operation of one or more pressure relief valves, each relief valve containing an internal flow passage with a valve seat and valve plug disposed therein, the method comprising:

sensing a temperature of a fluid in the internal flow passage downstream of the valve seat;

generating a valve temperature signal representative of the temperature of the fluid downstream of the valve seat;

monitoring the valve temperature signal to detect a rate of change in the temperature of the fluid downstream of the valve seat;

sensing, by a pressure sensor, an internal pressure of an inlet pressure line connected to the internal flow passage upstream of the valve seat;

generating, by the pressure sensor, a line pressure signal representative of the internal pressure of the inlet pressure line;

comparing, by a computing device, the line pressure signal against at least one expected line pressure value to determine a line pressure status; and determining, by the computing device, operational status of the pressure relief valve based on the comparison of the detected rate of change of the fluid temperature downstream of the valve seat and an expected rate of change in temperature for a predetermined pressure relief valve, and based on the line pressure status.

2. The method of claim 1, further comprising transmitting the valve temperature signal to a remote computer, wherein the valve temperature is monitored at the remote computer.

3. The method of claim 1, further comprising transmitting the line pressure signal to a remote computer, wherein the internal pressure of the inlet pressure line is monitored at the remote computer.

4. The method of claim 1, further comprising: sensing the ambient temperature outside of and in proximity to the pressurized inlet line; generating an ambient temperature signal representative of the sensed ambient temperature; and comparing the internal temperature signal to the ambient temperature signal to determine at least one temperature relationship.

5. The method of claim 1, wherein the predetermined pressure relief valve status comprises a normal open condition or a normal closed condition.

6. A system for determining operational status of pressure relief valves, said system comprising:

a pressurized inlet line connected to an upstream end of an internal flow passage of a pressure relief valve, the pressurized inlet line comprising:

a pressure sensor adapted to measure an internal pressure of a fluid in the pressurized inlet line and convert the measured pressure into an inlet line pressure signal;

a temperature sensor adapted to measure a temperature of a fluid in the internal flow passage downstream of a valve seat of a valve plug disposed in the internal passage and convert the measured temperature of the fluid into a downstream fluid temperature signal; and a computing device coupled with the pressure sensor and the temperature sensor, the computing device adapted to determine:

line pressure status based on a comparison of the inlet line pressure signal and at least one expected pressure value;

a rate of change of the fluid temperature downstream of the valve seat based at least on the downstream fluid temperature signal; and an operational status of the at least one pressure relief valve based at least on the line pressure status and a rate of change in downstream fluid temperature, wherein said computing device is further adapted to:

compare the determined rate of change of the fluid temperature downstream of the valve seat with an expected rate of change in temperature associated with a predetermined pressure relief valve status; and determine operational status of the pressure relief valve based on the comparison of the determined rate of change in the fluid temperature downstream of the valve seat and the expected rate of change in temperature associated with the predetermined pressure relief valve status.

7. The system of claim 6, wherein the computing device is remote from the at least one pressure relief valve and each pressure relief valve further comprises a communication device adapted to communicate the internal temperature signal to the remote computing device.

8. The system of claim 6, wherein the computing device is remote from the pressurized inlet line, the pressurized inlet line further comprising a communication device adapted to communicate the line pressure signal to the remote computing device.

9. The system of claim 6, wherein the at least one expected pressure value comprises an operational pressure of the pressurized inlet line.

10. The system of claim 6, wherein the inlet line further comprises a second temperature sensor adapted to measure the ambient temperature outside of and in proximity to the pressurized inlet line.

11. The system of claim 6, wherein the pressure relief valve is one of a pneumatic, electromagnetic, pilot, or spring-operated relief valve.

12. A system for determining operational status of pressure relief valves, said system comprising:

a pressurized inlet line connected to an upstream end of an internal flow passage of the pressure relief valve, the pressurized inlet line comprising:

a pressure sensor adapted to measure an internal pressure of a fluid in the pressurized line and convert the measured pressure into an inlet line pressure signal;

a temperature sensor adapted to measure a temperature of a portion of the internal flow passage downstream of a valve seat of a valve plug disposed in the internal passage and convert the measured temperature of the portion of the internal flow passage into a valve temperature signal; and a computing device adapted to determine:

a line pressure status based on a comparison of the line pressure signal and at least one expected pressure value;

a rate of change of the fluid temperature downstream of the valve seat based at least on the valve temperature signal; and an operational status of the at least one pressure relief valve based at least on the line pressure status and rate of change in temperature of the portion of the internal flow passage;

wherein the computing device is further adapted to:

compare the determined rate of change of the fluid temperature downstream of the valve seat with an expected rate of change in temperature associated with a predetermined pressure relief valve status; and determine operational status of the pressure relief valve based on the comparison of the determined rate of change of the fluid temperature downstream of the valve seat and the expected rate of change in temperature associated with the predetermined pressure relief valve status.

13. The system of claim 12, wherein the temperature sensor is disposed on an interior surface of the internal flow passage.

14. The system of claim 12, wherein the temperature sensor is disposed in an internal volume of the internal flow passage.

15. The system of claim 12, wherein the inlet line further comprises a second temperature sensor adapted to measure the ambient temperature outside of and in proximity to the pressurized inlet line.

16. The system of claim 12, wherein the computing device is remote from the at least one pressure relief valve and each pressure relief valve further comprises a communication device adapted to communicate the internal temperature signal to the remote computing device.

17. The system of claim 12, wherein the computing device is remote from the pressurized inlet line, the pressurized inlet line further comprising a communication device adapted to communicate the line pressure signal to the remote computing device.

18. The system of claim 12, wherein the at least one expected pressure value comprises an operational pressure of the pressurized inlet line.

19. The system of claim 12, wherein the pressure relief valve is one of a pneumatic, electromagnetic, pilot, or spring-operated relief valve.

* * * * *